United States Patent [19]
Jain et al.

[11] Patent Number: 5,842,010
[45] Date of Patent: Nov. 24, 1998

[54] PERIODIC WIRELESS DATA BROADCAST

[75] Inventors: Ravi Kumar Jain, Hoboken, N.J.; John St. Clair Werth, Jr., Austin, Tex.

[73] Assignee: Bell Communications Research, Inc., Morristown, N.J.

[21] Appl. No.: 427,056

[22] Filed: Apr. 24, 1995

[51] Int. Cl.⁶ .................................................. G06F 17/30
[52] U.S. Cl. .............................. 395/675; 345/615; 348/1
[58] Field of Search ................................. 395/600, 601, 395/615; 355/2; 348/1, 2; 370/50

[56] References Cited

U.S. PATENT DOCUMENTS

| | | | |
|---|---|---|---|
| 3,909,536 | 9/1975 | Watson et al. | 179/2 |
| 4,397,019 | 8/1983 | Alvarez et al. | 370/104 |
| 4,546,382 | 10/1985 | McKenna et al. | 358/84 |
| 4,589,018 | 5/1986 | Haskell et al. | 358/142 |
| 4,630,108 | 12/1986 | Gomersall | 358/84 |
| 4,658,290 | 4/1987 | McKenna et al. | 358/84 |
| 4,769,697 | 9/1988 | Gilley et al. | 358/84 |
| 5,075,771 | 12/1991 | Hashimoto | 358/84 |
| 5,283,734 | 2/1994 | Von Kohorn | 364/412 |
| 5,382,970 | 1/1995 | Kiefl | 348/1 |

OTHER PUBLICATIONS

Acharya et al., "Broadcast Disks: Data Management for AsymmetricCommunication Environments", UMCP—CSD CS–TR–3369, University ofMaryland, Oct. 1994, pp. 1–26.

Videoprint, vol. 4, No. 24, 22 Dec. 1983, Anonymous, Television Ratings on British Videotex, pp. 7–9.

PC Week, vol. 4, No. 30, 28 Jul. 1987, Hindin, pp. C1–C2.

Digital Media, vol. 3, No. 1, 23 Jun. 1993, Caruso, "Hewlett–Packard Finds What Customers Really Want; Market Research Quantifies the Fan Club for ITV", pp. 10–12.

*Primary Examiner*—Thomas G. Black
*Assistant Examiner*—Paul R. Lintz
*Attorney, Agent, or Firm*—James W. Falk; Joseph Giordano

[57] ABSTRACT

A periodic wireless data transmission has improved access latency obtaining information regarding users' interest in the information and by arranging the information on an transmission in order of descending popularity. In one embodiment, each adjacent pair of topics on the transmission. The topics' positions on the transmission are exchanged if the exchange decreases the average latency for all users. This may be repeated for all of the topics on the transmission. The transmission structure may also be arranged so that the transmission combines a number of transmission channels to obtain greater aggregate capacity. This may be done using, for example, an FDMA transmission structured to be theoretically comparable to a plurality of "striped" disks known as a RAID (redundant array of inexpensive disks).

15 Claims, 11 Drawing Sheets

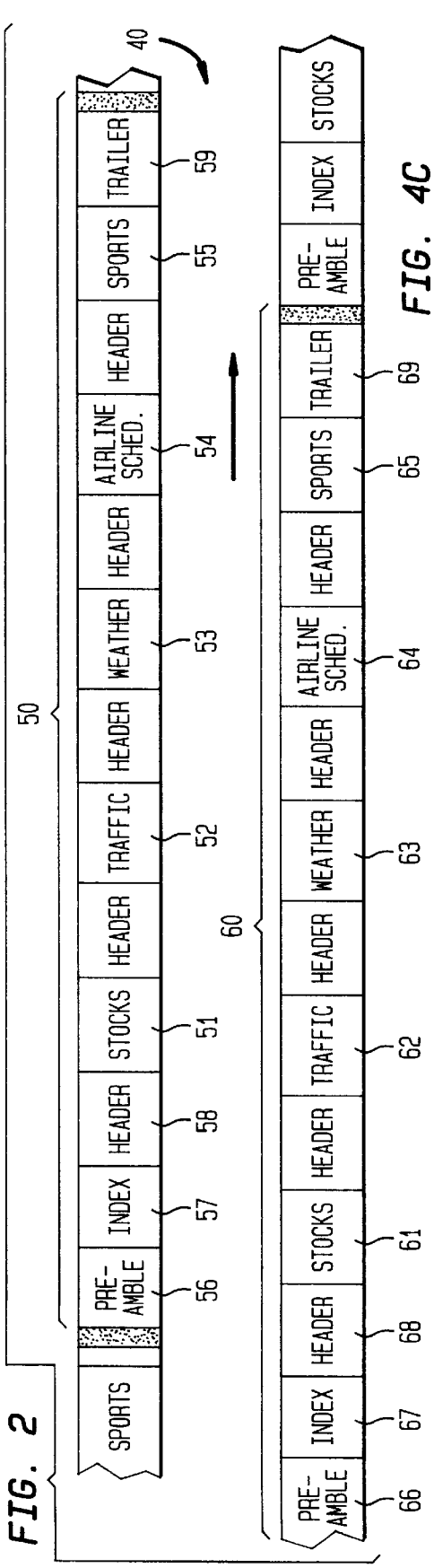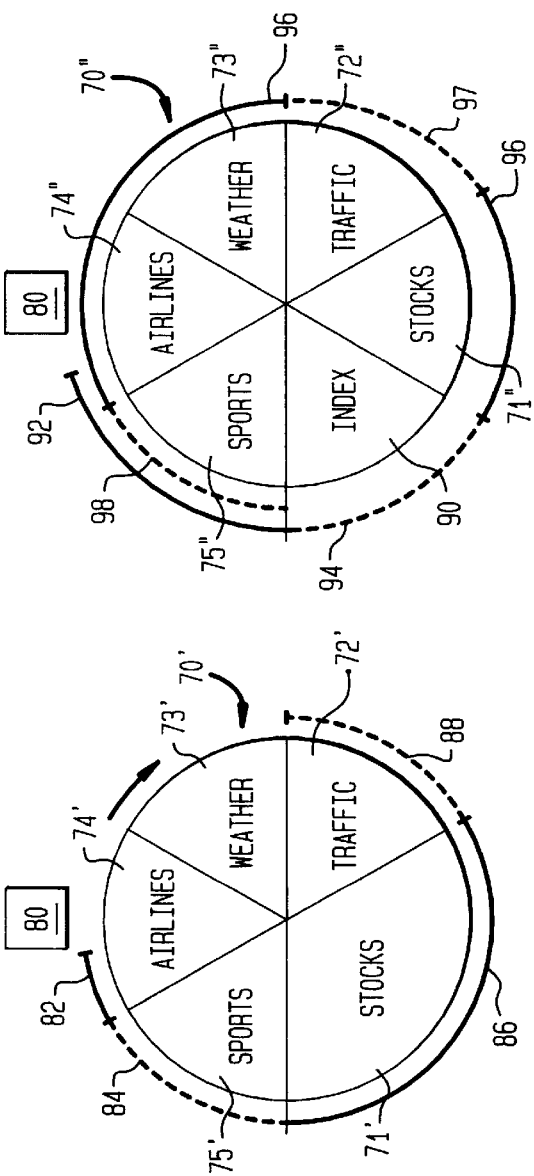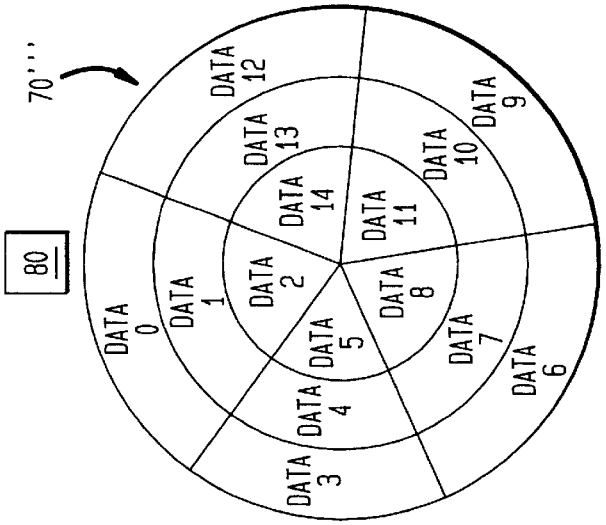
FIG. 2
FIG. 4A
FIG. 4B
FIG. 4C

| USER | STOCKS | TRAFFIC | WEATHER | SPORTS | AIRLINES |
|------|--------|---------|---------|--------|----------|
| 1 | 1 | 1 | 0 | 1 | 0 |
| 2 | 1 | 1 | 1 | 0 | 0 |
| 3 | 0 | 0 | 1 | 0 | 0 |
| 4 | 1 | 1 | 1 | 0 | 0 |
| 5 | 1 | 0 | 0 | 0 | 0 |
| 6 | 1 | 0 | 0 | 0 | 0 |
| 7 | 1 | 0 | 1 | 0 | 0 |
| 8 | 0 | 1 | 0 | 1 | 0 |
| 9 | 0 | 1 | 0 | 1 | 0 |

(AIRLINES   0   DELETED)
SPORTS     3
WEATHER    4
TRAFFIC    5
STOCKS     6

| USER | MAXIMUM POSITION |
|---|---|
| 1 | SPORTS (4) |
| 2 | WEATHER (3) |
| 3 | WEATHER (3) |
| 4 | WEATHER (3) |
| 5 | STOCKS (1) |
| 6 | STOCKS (1) |
| 7 | WEATHER (3) |
| 8 | SPORTS (4) |
| 9 | SPORTS (4) |
| TOTAL | M = 26 |

| USER | MAXIMUM POSITION |
|---|---|
| 1 | SPORTS (3) |
| 2 | WEATHER (4) |
| 3 | WEATHER (4) |
| 4 | WEATHER (4) |
| 5 | STOCKS (1) |
| 6 | STOCKS (1) |
| 7 | WEATHER (4) |
| 8 | SPORTS (3) |
| 9 | SPORTS (3) |
| TOTAL | $M'_1$ = 27 |

| USER | MAXIMUM POSITION |
|---|---|
| 1 | SPORTS (4) |
| 2 | TRAFFIC (3) |
| 3 | WEATHER (2) |
| 4 | TRAFFIC (3) |
| 5 | STOCKS (1) |
| 6 | STOCKS (1) |
| 7 | WEATHER (2) |
| 8 | SPORTS (4) |
| 9 | SPORTS (4) |
| TOTAL | $M'_2$ = 24 |

| USER | MAXIMUM POSITION |
|---|---|
| 1 | SPORTS (4) |
| 2 | TRAFFIC (3) |
| 3 | WEATHER (1) |
| 4 | TRAFFIC (3) |
| 5 | STOCKS (2) |
| 6 | STOCKS (2) |
| 7 | STOCKS (2) |
| 8 | SPORTS (4) |
| 9 | SPORTS (4) |
| TOTAL | $M'_3$ = 25 |

FIG. 15
(PRIOR ART)
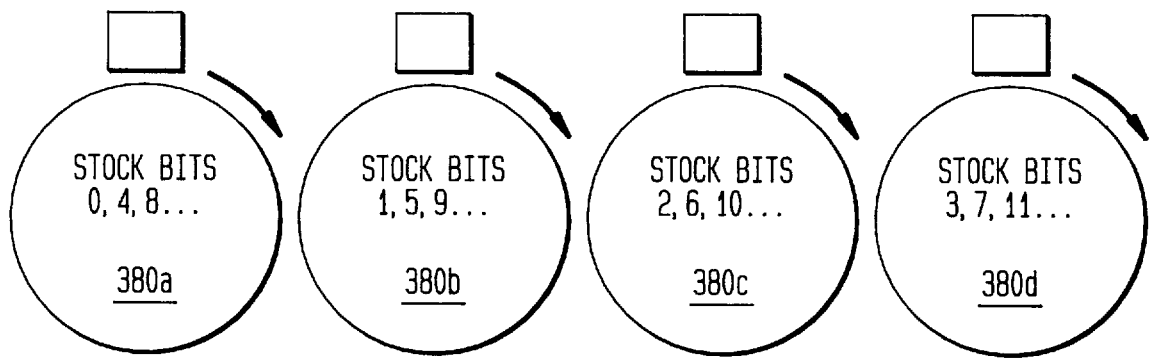
FIG. 16
(PRIOR ART)
NON-REDUNDANT (RAID LEVEL 0)
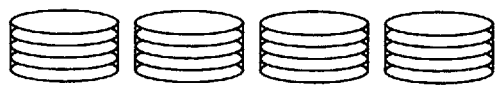
MIRRORED (RAID LEVEL 1)
MEMORY-STYLE ECC (RAID LEVEL 2)
BIT-INTERLEAVED PARITY (RAID LEVEL 3)
BLOCK-INTERLEAVED PARITY (RAID LEVEL 4)
BLOCK-INTERLEAVED DISTRIBUTED-PARITY (RAID LEVEL 5)
P + Q REDUNDANCY (RAID LEVEL 6)

| DATA BLOCK 00 | DATA BLOCK 10 | DATA BLOCK 20 | DATA BLOCK 30 | PARITY BLOCK a0 |
|---|---|---|---|---|
| DATA BLOCK 01 | DATA BLOCK 11 | DATA BLOCK 21 | DATA BLOCK 31 | PARITY BLOCK a1 |
| DATA BLOCK 02 | DATA BLOCK 12 | DATA BLOCK 22 | DATA BLOCK 32 | PARITY BLOCK a2 |
| DATA BLOCK 03 | DATA BLOCK 13 | DATA BLOCK 23 | DATA BLOCK 33 | PARITY BLOCK a3 |
| DATA BLOCK 04 | DATA BLOCK 14 | DATA BLOCK 24 | DATA BLOCK 34 | PARITY BLOCK a4 |

| DATA BLOCK 0 | DATA BLOCK 1 | DATA BLOCK 2 | DATA BLOCK 31 | PARITY BLOCK 0 |
|---|---|---|---|---|
| DATA BLOCK 5 | DATA BLOCK 6 | DATA BLOCK 7 | PARITY BLOCK 1 | DATA BLOCK 4 |
| DATA BLOCK 10 | DATA BLOCK 11 | PARITY BLOCK 2 | DATA BLOCK 8 | DATA BLOCK 9 |
| DATA BLOCK 15 | PARITY BLOCK 3 | DATA BLOCK 12 | DATA BLOCK 13 | DATA BLOCK 14 |
| PARITY BLOCK 4 | DATA BLOCK 16 | DATA BLOCK 17 | DATA BLOCK 18 | DATA BLOCK 19 |

| DATA 0 | DATA 1 | DATA 2 | DATA 3 | REDUNDANCY 0P | REDUNDANCY 0Q |
|---|---|---|---|---|---|
| DATA 6 | DATA 7 | REDUNDANCY 1P | REDUNDANCY 1Q | DATA 4 | DATA 5 |
| REDUNDANCY 2P | REDUNDANCY 2Q | DATA 8 | DATA 9 | DATA 10 | DATA 11 |
| DATA 12 | DATA 13 | DATA 14 | DATA 15 | REDUNDANCY 3P | REDUNDANCY 3Q |
| DATA 18 | DATA 19 | REDUNDANCY 4P | REDUNDANCY 4Q | DATA 16 | DATA 17 |

PERIODIC WIRELESS DATA BROADCAST

FIELD OF THE INVENTION

The present invention is directed to an improved periodic wireless data broadcast and, more particularly, to (1) an improved method of arranging data on a periodic broadcast and (2) an improved signal structure for such broadcasts.

BACKGROUND OF THE INVENTION

Delivering information via wireless transmission is becoming increasingly popular. As seen in FIG. 1, information, such as stock prices, traffic information, weather reports, airline schedules, and sports scores, may be broadcast from a single source, such as a service provider 30 (not unlike a cellular phone service provider) to a number of recipients (users) 32 via a wireless transmission media. These media may be, for example, paging networks, FM subcarrier networks, cellular phone networks, and PCS (personal communications services) networks. This application will refer to the media simply as a "wireless media network".

A user 32 may be a person having a wireless terminal 34, such as a personal digital assistant (PDA), as is illustrated in FIG. 1. (The wireless terminal 34 is often referred to as a "client", and the ultimate human recipient of the information is referred to as a "user".) A PDA is typically a laptop or palmtop computer connected to a wireless media network. The wireless terminal 34 usually is not connected to any direct power source, but rather runs on either conventional or rechargeable batteries. Because wireless terminals are often used away from the home or office, it is an important consideration of a wireless terminal user to maximize the length of time that the terminal may operate without having to change or recharge batteries. Thus, it is important to minimize the power consumption necessary for the client to receive, decode, and display information received over the wireless data network, thus increasing the useful life of the battery.

One method of transmitting information over a wireless network is to broadcast the information periodically. This method is well-known and has been discussed in Imielinski et al, "Energy Efficient Indexing on Air", Proc. ACM SIGMOD Conference, May, 1994. In August 1994 the inventors noted the similarity of this method to the method of writing data on a standard rotating magnetic disk, and thus called the method an "airdisk" by analogy. Subsequently, Zdonik et al, "Are 'Disks in the Air' Just Pie in the Sky?", Proc. IEEE Workshop on Mobile Computing Systems and Applications, Dec. 8–9, 1994, also noted this similarity, and called this method a "broadcast disk". An "airdisk" is a periodic transmission of data over a wireless network. It is called an airdisk because it may be theoretically compared to a rotating data disk, as will be illustrated below. FIG. 2 shows a periodic broadcast 40 having a number of transmissions (the arrow indicates increasing time). A first transmission 50 includes the following sequence of topics: stock prices 51, traffic 52, weather 53, airline schedules 54, and sports scores 55. After the transmission 50 is complete, a new transmission 60 is immediately sent, beginning with, in this example, stock information 61, traffic 62, etc. Each transmission may begin with a preamble 56, 66 indicating the beginning of a transmission. The preamble may be followed by an index 57, 67 which indicates the location of the beginning of each topic in the transmission. Each topic 51–55, 61–65 may begin with a topic header 58, 68 which indicates the start of a topic. Each transmission may end with a trailer 59, 69 indicating the end of a transmission.

Although the example in FIG. 2 shows the broadcast is composed of different items defined as topics of information (stock prices 51, traffic 52, etc.), it could just as well be the case that the broadcast contains items which relate to a single topic. For example, FIG. 2 could refer to stock prices only, with a first transmission including the following sequence of items which relate to a single topic: IBM price, NYNEX price, HP price, and so on. This discussion often refers to "topics" for illustration. In most instances, however, the illustration is equally applicable to smaller items, such as information about particular stocks, traffic conditions on certain roadways, or weather conditions for a certain geographic region.

The broadcast 40 is periodic because each transmission is immediately followed by another. As seen in FIG. 3, the periodic broadcast 40 of FIG. 2 may be theoretically compared to a revolving disk 70 (i.e., such as a computer or optical disk) and a read head 80 (i.e., such as a magnetic or optical head) (the arrow indicates the direction of disk rotation). The disk in this illustration is separated into five radial portions called sectors. These sectors contain stock 71, traffic 72, weather 73, airline 74, and sports 75 information, respectively. Protocol related portions of the signal such as the preamble, the index, the headers, and the trailer are omitted for simplicity. After a complete rotation of the disk 70, the same sector is presented to the head 80 for reading. Similar to a computer disk, the periodic broadcast 40 may be updated by the service provider 30 so that subsequent rotations may include revised, additional, or altered data; and the data may be presented in a different sequence.

Much of the information on the airdisk is dynamic—for example, stock prices, sports scores, weather, and traffic conditions may change throughout the day. Thus, after a period of time some information transmitted in a periodic broadcast may become "stale" and is of little use to the user 32 (i.e., hours old stock prices during active trading). Thus, the amount of time it takes a client 34 to access all of the desired information (referred to as "access latency") is one measure of performance for an airdisk transmission. Also, because many periodic broadcast clients may be wireless terminals, where power efficiency is a major concern, power consumption may be minimized by the ordering of the data in the transmission. This is illustrated in FIGS. 4a and 4b.

Using the rotating disk analogy, FIGS. 4a and 4b show the importance of data ordering in instances where the transmission is not indexed and indexed, respectively. Using an index in a periodic transmission is discussed in the Imielinski et al. paper cited above.

Where the transmission has no index, the receiver, such as a wireless terminal 34, must be on at all times to determine whether it is receiving information it is interested in so that it may read this information. This constant monitoring of the incoming transmission inefficiently consumes power. Alternatively, if all of the information sections are of equal size—and thus of equal time length—the terminal 34 could be programmed to turn on at the beginning of each section and quickly determine if the section includes data desired to be read. This alternative conserves power but may be impractical because the sections may be of differing lengths and because the information is dynamic, each section may be a different length each broadcast. (Unlike a physical disk, an airdisk may increase or decrease in size if information is added or deleted to a topic.) If the sections are certain types of data items, such as stock prices, however, the items may be arranged to have identical lengths.

An index may be provided at the beginning of each transmission giving the sequence of topics and the location of the beginning of each topic in the upcoming transmission. This is advantageous because it allows the terminal 34 to be "off" (i.e., consuming a reduced amount of power) except when desired information is being broadcast. This reduces the "on" time for the wireless transmitter 34 and conserves power. An index may be disadvantageous, however, because it requires additional data to be included in the broadcast. This makes the airdisk "larger" and takes a longer time to transmit the entire periodic broadcast.

FIG. 4a illustrates the access latency for an unindexed airdisk 70'. A user 32 is interested in sports and traffic information. At the random time shown in this figure, the read head 80 is positioned over airline information 74'. A first time delay—a rotational latency 82—occurs in the time it takes the disk to rotate to a topic of interest (in this illustration, sports is the first topic of interest presented to the read head 80). The next time period is the read time 84 (illustrated by a dashed line), that is, the time that the information about the desired topic is being read from the disk 70' by the read head 80. A second time delay—a topic (or item) spread 86—occurs during the time it takes the disk to rotate to the last topic of interest. The final time period is the final topic read time 88 when the final information about the topic of interest is read by the read head 80. Because information is read on-the-fly (i.e., it is read relatively instantaneously as it rotates past the read head 80), the total access latency would be the same if some or all of the topics between sports and traffic were also desired. That is, in this illustration, the access latency and the terminal "on" time would have been the same if the user wanted stock information 71', as well. Thus, in this example, the access latency for all of the desired topics is about three quarters of a rotation (about three quarters of a complete transmission).

FIG. 4b illustrates the access latency for an indexed airdisk 70". Note that the airdisk 70' includes an index 90. Again, the topics the user 32 is interested in are sports 75" and traffic 72". At the random time shown in this figure, the read head 80 is positioned over airline information 74". A first time delay—a rotational latency 92 for the index 90—occurs in the time it takes the disk to rotate to the index 90. Note that the sports information 75", which is the user is interested in, was not read because the index 90 has not yet been read and therefore the client 34 does not know the location of the sports information. Thus, the sports information 75" is passed over until the next rotation (i.e., the next transmission). The next time period is, the index read time 94 (illustrated by a dashed line). This is the time that the index 90 is being read by the read head 80. A second time delay—a topic (or item) reach 96—occurs during the time the disk rotates to the last topic of interest (here, sports 75"). Note that during the topic reach 96, information about topics of interest (traffic 72") is read. The traffic information read time 97 (illustrated by a dashed line) is part of the topic reach 96. Because reading is done on-the-fly, this read time 97 does not affect the topic reach 96. The final time period of the access latency is the final topic read time 98 when information about the final topic of interest (sports 75") is read by the read head 80. Because of the index 90, the terminal 43 is only "on" when information about topics of interest is being read. The total "on" time for the terminal 34 is the index read time 94, the traffic information read time 97, and the sports information read time 98. Thus, the total on-time is reduced from that of the non-indexed airdisk of FIG. 4a. On the other hand, the total access latency is much greater in this illustration, and exceeds the time for a complete rotation due to the index rotational access latency 92.

"Access latency" as used in this patent application, refers to the total time for:

a) the rotational latency;

b) the first item read time;

c) the item reach or spread (including any read times); and d) the last item read time.

Actual data disks have another time delay as illustrated in FIG. 4c. A disk 70''' may be arranged with data stored in sectors divided by annular tracks. In FIG. 4c, the disk 70''' is divided into five sectors and three tracks. This creates fifteen areas for storing data (i.e., data 0–data 14). The additional time delay is due to positioning the read head 80 over the appropriate track when the sector is positioned by the read head 80. This time delay does not apply to the disks 70', 70'' because they have only one track, nor to airdisks because there is no head to be physically positioned over a track.

One way to reduce the average access latency for a number of users 32 would be to order the topics on the transmission so that the average access latency for all users 32 is minimized. The rotational latency and data transfer times are fixed once the set of information in a given rotation (transmission) is decided. However, the topic spread (or topic reach) may still be varied by knowing in advance the sequence of the topics on the disk. If the topics which the users 32 desire to read is known in advance (how this may be done is described below), a disk layout (i.e., a transmission) may be chosen to reduce the average topic spread or reach for all users. That is, if many users are interested in stock and traffic information, these users' access latency may be minimized by placing these two topics first.

We the inventors of the present invention, however, have proven that the algorithm minimizing the access latency for a number of users 32 each requesting two or more items is "NP-complete" (non deterministic polynomial time complete). This means that the algorithm is mathematically intractable to calculate. This is discussed in Jain and Werth, "Airdisks and AirRAID: Modeling and Scheduling Periodic Wireless Data Broadcast (Extended Abstract)", presented on Apr. 27, 1995 at Rutgers University Winlab Workshop. The contents of this paper are incorporated herein by reference.

Another problem associated with periodic wireless data broadcasts is that an increased data amount results in a "bigger" airdisk. That is, the time for a complete periodic transmission increases. This longer transmission time results in a longer potential access latency which, as discussed above, is undesirable due to the dynamic nature of some of the information in the broadcast. Also, in many existing wireless spectrum transmission channels, data communications must coexist with voice communications. The wireless spectrum is divided into multiple channels, where the bandwidth is optimized for voice or short message communications (such as paging).

For example, a Wireless Access Communications Systems (WACS) has been proposed by Bellcore in a paper entitled "Generic Criteria for Version O.I. Wireless Access Communications Systems (WACS)", Technical Advisory TA-NWT-001313, Issue 1, July 1992. This system uses transmissions having frames divided into time slots. Each frame has eight time slots. Each time slot is 2.5 msec and is capable of holding 32 kb/sec. (Other wireless transmission media may be capable of broadcasting at only 16 kb/sec.) Thus, in one minute a broadcast could transmit 1.92 Mbits. However, data "overhead", such as packet framing, indexes, preambles, headers, trailers, and the like reduce the amount of actual data in a transmission, effectively reducing the speed of a transmission. Thus, a 1 megabyte (i.e., 8 megabit) transmission may take as long as eight minutes. Moreover, as the amount of data in the transmission increases, the transmission time (the rotation time) increases linearly. The increased transmission time (the rotation time) results in an increased access latency. Because the value of some information decreases with time (i.e., stock prices during active trading), a high access latency is unacceptable. Thus, it is desirable to increase the "storage capacity" of an airdisk, so that a large number of bytes are transmitted per unit time.

Thus, it is an object of the present invention to provide a method for arranging the information on a periodic transmission which reduces the average access latency for clients of a wireless data service provider.

It is another object of the present invention to provide a transmission signal structure which increases an airdisk's storage capacity without incurring undesirable access latency penalties.

It is yet another object of the present invention to provide an efficient periodic wireless transmission having adequate error correction.

SUMMARY OF THE INVENTION

These objects are achieved by a periodic wireless data transmission according to the present invention. The order of topics or items on an airdisk may be arranged by sorting the topics or items to be transmitted onto a list in order of popularity. In one preferred embodiment, this list may be revised by comparing each adjacent pair of topics on the list. The. topics' positions on the list are exchanged if the exchange decreases the average latency for all users. This is repeated for all of the topics on the list.

In a second preferred embodiment, users are provided with a number of votes to select items or topics of interest, which may be "cast" in any manner the user chooses (even casting fractions of one vote). This prevents users interested in a few items or topics from being "outvoted" by users interested in many items or topics. One way this may be done, for example, is by providing each user with one "popularity vote", which may be used on one or more items. If more than one item is chosen, the value of the user's vote is decreased to the fraction 1/x, where x is the total number of items the user selected. The value of all the votes for an item or topics is added in determining the order of popularity.

In a third preferred embodiment, after the popularity list is sorted, the comparison of adjacent topics or items is performed iteratively. For example, once the most popular topic is, determined, the process is repeated for all users not interested in the most popular topic or item. This is repeated until all of the topics or items have been sorted.

The transmission structure may also be arranged so that the transmission combines a number of transmission channels to obtain greater aggregate capacity. This may be done, for example, by structuring the transmissions to be theoretically comparable to a plurality of "striped" data disks. Data disk striping is writing adjacent data units across an array of synchronized rotating disks. This allows data to be accessed in parallel. In a preferred embodiment, data is "striped" onto a wireless media transmission by writing adjacent data units across a number of frequencies of an FDMA transmission. This allows a client to receive the information of interest simultaneously from a plurality of frequencies.

BRIEF DESCRIPTION OF THE DRAWINGS

The present invention is described with reference to the following figures:

FIG. 2 illustrates a periodic wireless data transmission;

FIG. 4a illustrates access latency in an unindexed airdisk;

FIG. 4b illustrates access latency in an indexed airdisk;

FIG. 4c illustrates a data disk having several tracks;

FIG. 11 is a calculation of the objective function value of the sorted list of FIG. 10;

FIG. 12 is a calculation of the objective function value of a first revised sorted list;

FIG. 13 is a calculation of the objective function value of a second revised sorted list;

FIG. 14 is a calculation of the objective function value of a third revised sorted list;

FIG. 15 illustrates data striping on an array of data disks;

FIG. 16 illustrates seven levels of RAID error correction;

FIGS. 18a, 18b, 18c, 18d, 18e, 18f, and 18g illustrate seven levels of error correction for transmissions according to the present invention.

DETAILED DESCRIPTION OF A PREFERRED EMBODIMENT

A. Arranging Information On A Periodic Wireless Data Broadcast

To arrange topics on a periodic wireless data transmission in a manner which reduces the average access latency for all users, the service provider 30 must have available some indication of which topics the users 32 have an interest. The service provider 30 may be made aware of these interests in any number of ways. Three of these methods are described below.

A first method for a service provider to obtain client interest information is to implement a profile-based system. Many communications systems, for example cellular telephone services, include a database, or "profile", of client information. The customer profile for a cellular telephone service provider may include, for example, data such as the user's name, address, long distance telephone service provider, service features (e.g., call forwarding and call restriction), billing, and other administrative related information.

Figure 1:
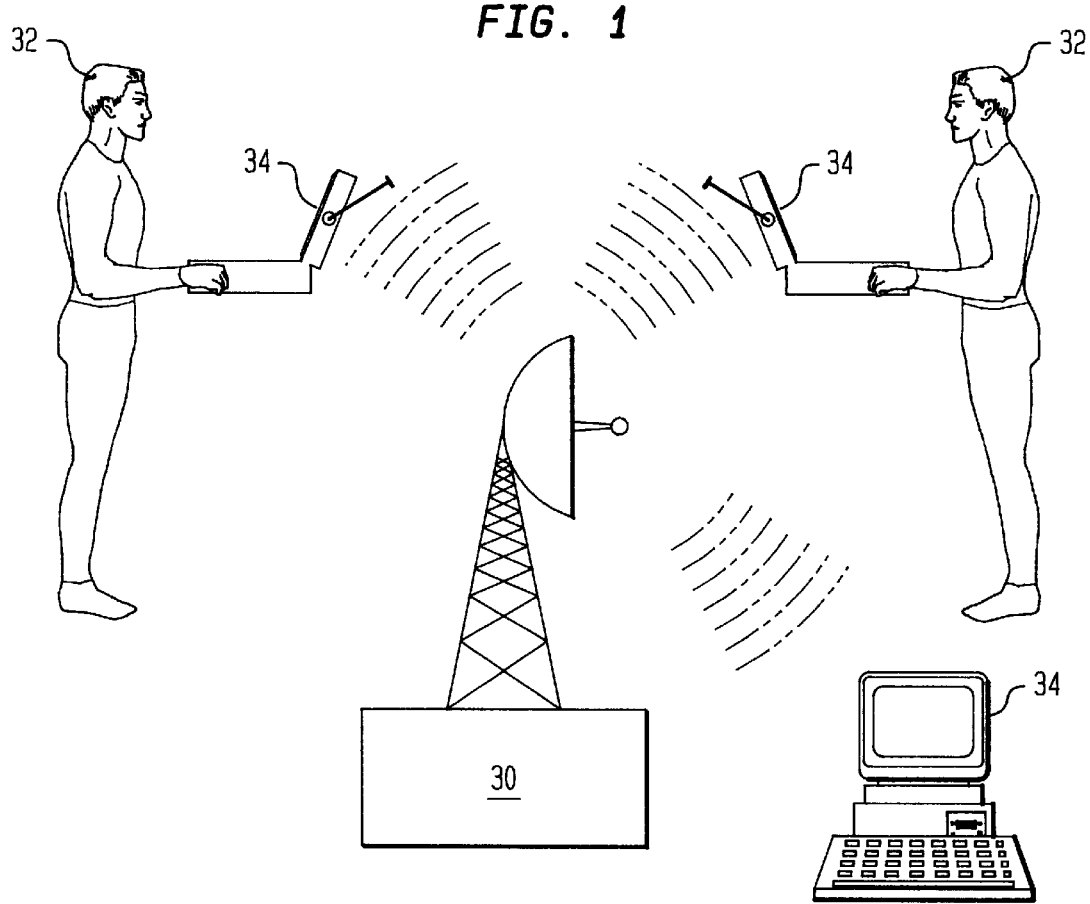
FIG. 1 illustrates a wireless data service.
Figure 3:
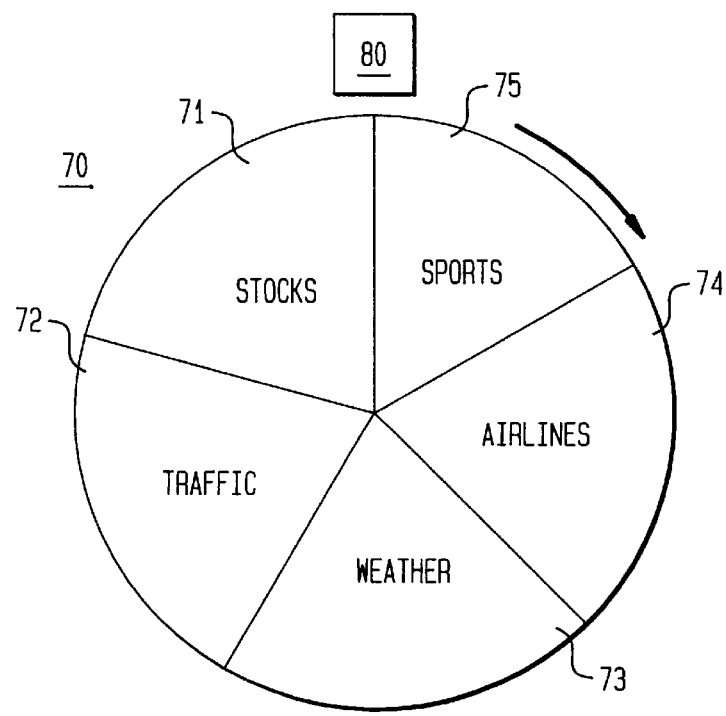
FIG. 3 illustrates an "airdisk" analogy to the wireless data transmission illustrated in FIG. 2.
Figure 5:
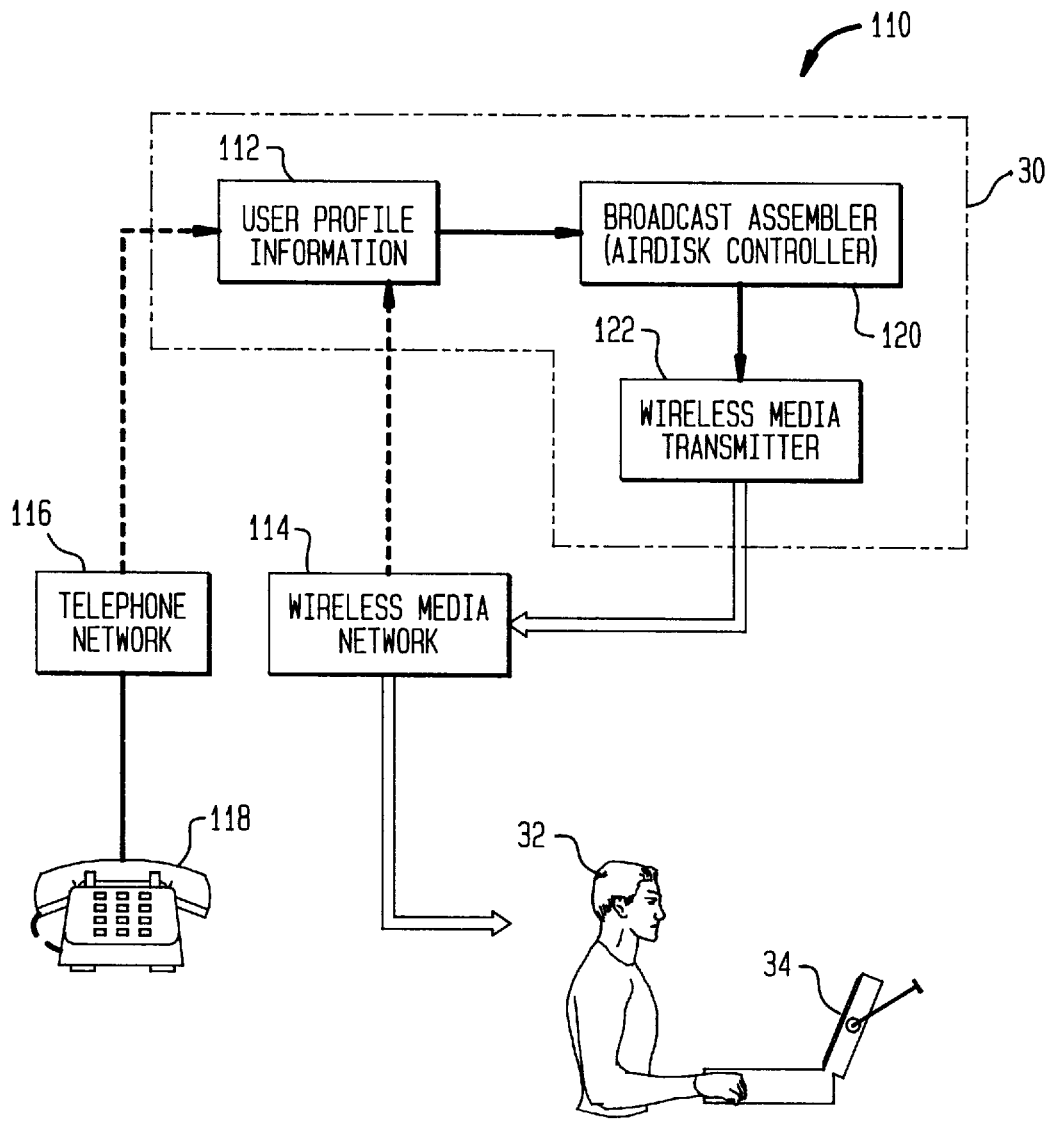
FIG. 5 is a block diagram of a first system used to obtain user interest information.

FIG. 5 shows a profile based wireless data service 110. In a profile-based information service, a user service profile may be used by the service provider 30 to obtain user interest information. One example may be a service provider 30 that provides traffic and weather information for several geographic areas and New York Stock Exchange ("NYSE") listings. When a user 32 subscribes to the service, a profile 112 for that user 32 may be created either by the service provider 30 using a computer or the like or by the user 34 over a wireless media network 114 via a wireless terminal 34, over a telephone network 116 via a telephone 118, or other communication device. The profile 112 may indicate, for example, that between 6:00 a.m.–7:00 a.m. the user 32 is interested in weather conditions for the user's geographic region, that between 7:30 a.m.–9:30 a.m. and 5:00 p.m.–6:30 p.m. the user is interested in traffic information about certain highways and bridges over which the user commutes to and from the office, and that between 9:30 a.m.–3:30 p.m. the user is interested in information about several stocks on the NYSE. The user 32 may occasionally update the profile, for example to receive traffic information for a route to a clients' office, by communicating this interest to the service provider 30 via the wireless terminal 34, telephone 118, or other communication device. By obtaining user profile information, the service provider 30 knows sufficiently in advance the topics and/or items each client is interested in at certain periods throughout the day. A broadcast assembler, or airdisk controller 120, uses the profile information for all or some of the users to arrange the topics and items and assemble the transmission in a manner described below. The assembled transmission is sent to a wireless media transmitter 122 for broadcast.

A second method for the service provider 30 to obtain client interest information is to directly poll a cross-section of all of the service provider's customers. This will provide a "Nielsen ratings"-type profile of the customers' information interests. The information provider 30 may also use its knowledge of the particular needs of its customers to arrange information to help reduce the average topic (or item) spread or reach, thus reducing the average access latency for all clients. For example, a service provider broadcasting traffic information to users commuting between New York City and New Jersey might reasonably guess that consecutively ordering traffic information about conditions on the Holland Tunnel, Lincoln Tunnel, and the George Washington Bridge will reduce the average topic spread or reach.

Figure 6:
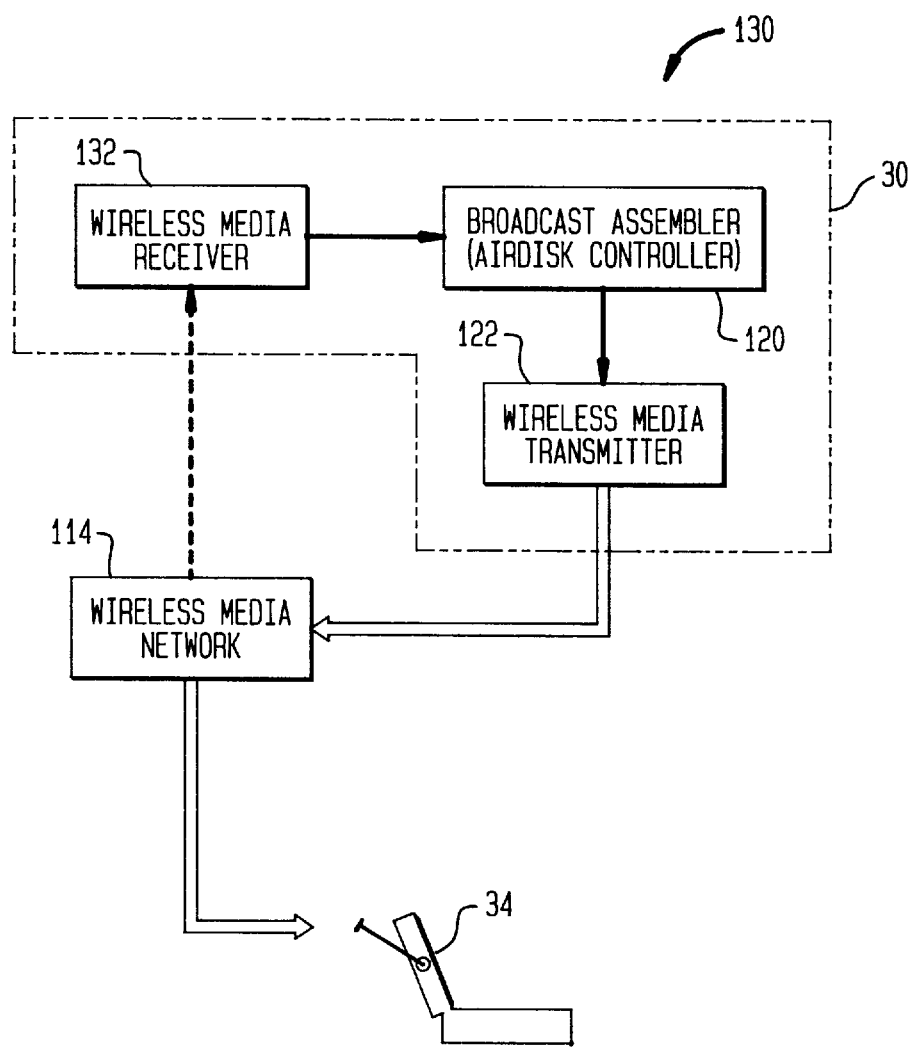
FIG. 6 is a block diagram of a second system used to obtain user interest information.

A third, dynamic system to obtain client interest information is shown in FIG. 6. This system 130 provides the wireless terminal 34 with an uplink to the service provider 30. An uplink is an active communication channel originating from the client 34 to the service provider 30. The uplink is illustrated in FIG. 6 by the two way arrow between the client 34 and the wireless media network 114. Users 32 can request information as it is needed by sending a request over the uplink. In an illustrative embodiment of this method, the service provider 30 monitors the uplink for a period of time referred to as the "batch length". The provider counts the number of requests received for each data item during the batch length period. Although the batch length may be any length, in a preferred embodiment the batch length is just less than the length of the current rotation (i.e., the complete length of the current transmission). The collected requests are used to arrange the topics on the next transmission.

It may be preferable for the service provider 30 to arrange the topics on the upcoming transmission based on only a cross-section of the requests received during the batch length. It may also be preferable to provide a method where users requesting unpopular information are not "starved". One method for achieving this end is as follows: a service provider 30 providing T total topics for broadcast includes in each rotation a subset of the p most popular topics (where p<T). The broadcast would then include transmissions which dynamically vary subsets of the remaining, less popular topics. This may be done, for example, by including in all broadcasts the most popular topics or items as determined by an average over time. Less popular requested items would be broadcast in a subset of all transmissions. If this method is used with the user uplink system of FIG. 6, the service provider 30 may disregard requests for the most popular items because it has already been determined that they will be included in the next transmission. The service provider may then process requests for less popular topics or items, thus reducing the number of requests needing processing. Alternatively, users may be precluded (either permanently or for a limited time period) from issuing requests for the most popular items, thus having the further benefit of conserving uplink bandwidth.

Figure 7:
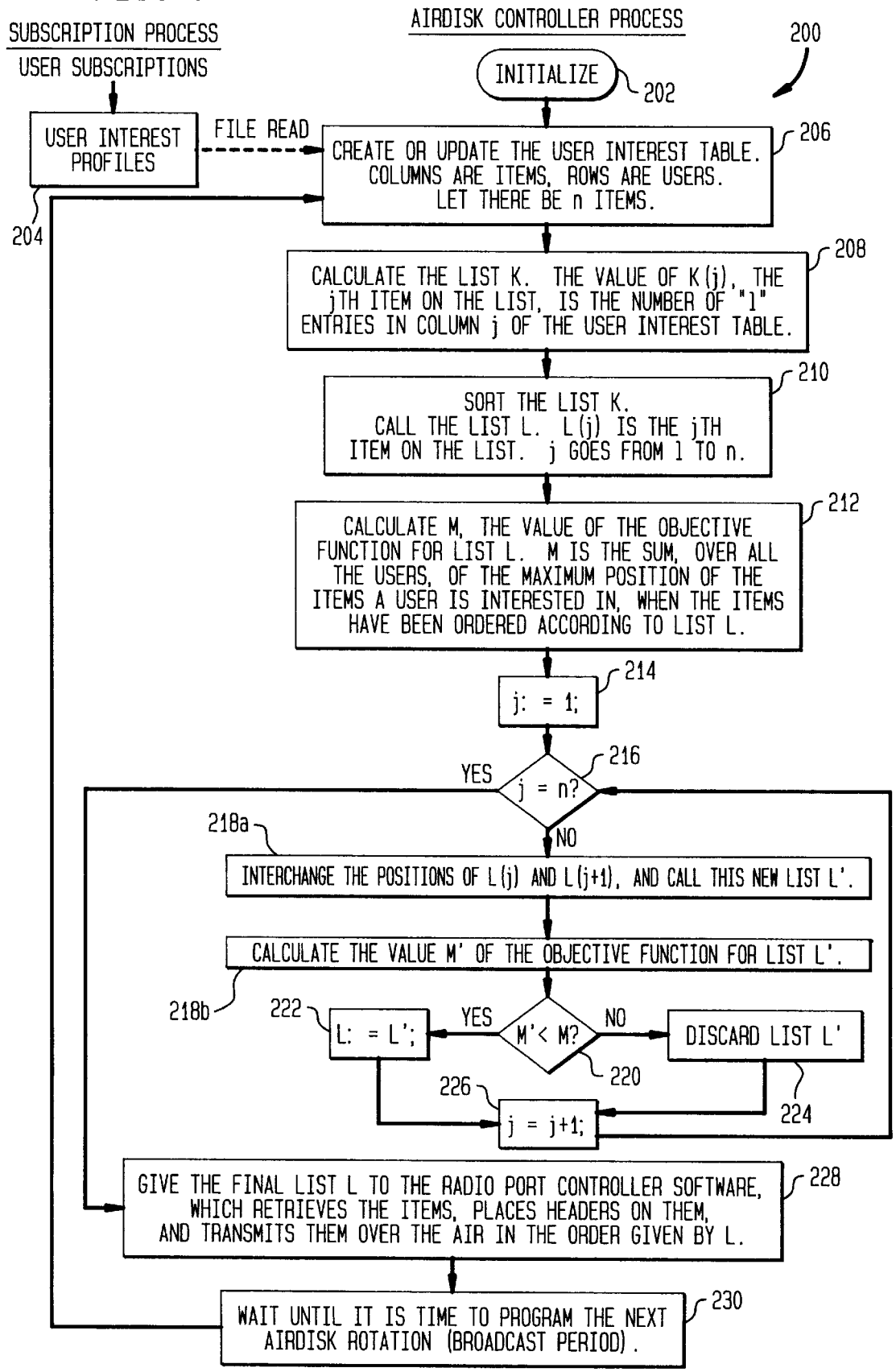
FIG. 7 is a flow chart of one method for arranging information on a periodic transmission according to the present invention.
Figures 8, 9, 10:
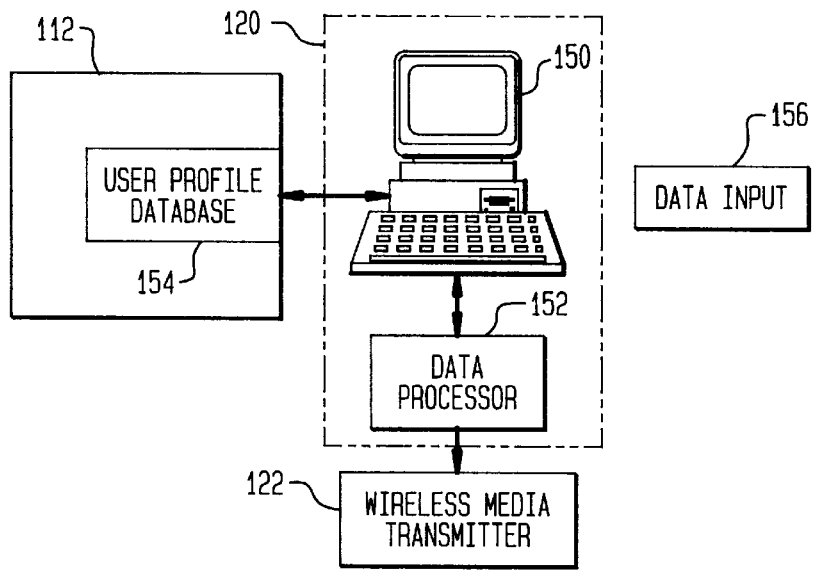
FIG. 8 is block diagram of a system for arranging information on a periodic transmission.
FIG. 9 is a user interest table.
FIG. 10 is a sorted list based on the user interest table of FIG. 9.

FIG. 7 is a flow chart of a method 200 for arranging topics on a transmission according to an embodiment of the present invention. In this illustrative method, the user interest information is collected by the service provider 30 via user profiles as seen in FIG. 5. The airdisk controller 120 and transmitter 122 may be conventional wireless media transmitting equipment programmed to perform the following method, as seen in FIG. 8. The airdisk controller 120 comprises a computer 150 and a data processor 152, such as a digital signal processor. The user profile information 112 includes a user profile database 154. The computer 150 receives the data to be included from a data input 156, which may be a manual input, a wireless or wireline network, or other means for providing information to the computer 150. The computer 150 also retrieves user interest information from the database 154 to arrange the topics and items into a desired order. The arranged topics and items are then sent to the data processor 152 to be converted into a format suitable for transmission. The converted data is then sent to a conventional wireless media transmitter 122. As noted above, the user may be interested in specific items within topics. That is, the user may be interested only in certain stock prices or traffic information on certain roads and bridges.

First, the airdisk controller 120 is initialized (step 202). The user interest information, such as the user profiles, is accessed and read (step 204). The airdisk controller 120 creates or updates a user interest table 250, illustrated in FIG. 9 (step 208). The user interest table 250 may be compiled from the accessed user interest information. The number of rows in the table equals the number of users interested in one or more topics at the current time. In the example of FIG. 9, at the current time, nine users are interested in receiving information. The columns in the table represent topics. Using the examples given in FIGS. 24, this user interest table 250 has five columns (stocks, traffic, airline schedules, weather, and sports). For each row i (i.e., for each user), a value, such as a "1" is assigned to a column j if the user i is interested in topic or item j, and a "0" otherwise. If a column has no is in it, that column is deleted. At this time, no user is interested in airline information, so this column is deleted. The total number of columns in the final table is n. In this example, n=4.

Next, a list K is calculated (step 208). The value of K(j), the jth topic on the list, is the total value (i.e., the number of "1" entries in column j of the user interest table) assigned to that topic. List K is sorted in ascending order of K(j) values (step 210). The sorted list is called L. FIG. 10 is the list L for the user interest table 250 of FIG. 9. Of the topics remaining on the list, stock information was the most requested topic (6 requests) and sports information was the least requested (3 requests)(airline information had no requests and was deleted from the list)., L(j) is the jth topic on list L. j ranges from 1 to n.

Next, M, the value of the objective function for list L is calculated (step 212). M is the sum of the maximum position value of the topics a user is interested in when the topics are ordered according to the list L for all users. FIG. 11 illustrates the calculation of M for the list L of FIG. 10. As an approximation of a method to minimize the access latency for all users 32 (i.e., users 1–9), the topics are arranged on the list from the most to the least popular. The average access latency for all of the users is obtained by adding up numerical values for the positions of the last topic of interest for each user. The numerical value for the positions of the topics on list L are:

| Stocks | 1 |
| Traffic | 2 |
| Weather | 3 |
| Sports | 4 |

Thus, user 1's last topic of interest is sports (4); user 2's last topic of interest is weather (3). The numerical values for all nine maximum positions are added up to determine M for list L. Here, M is 26.

Let j=1 (step 214) and determine if j=n (step 216). If j is not equal to n, then steps 218–226 are preformed. If j equals n, then steps 228 and 230 are performed.

If j is not equal n, then the positions of topics L(j) and L(j+1) are interchanged and a new list L' is created (step 218a). In this example, the positions of weather and sports are exchanged. The order of new list $L_1'$ is:

| Stocks | 1 |
| Traffic | 2 |
| Sports | 3 |
| Weather | 4 |

M', the value of the objective function for list new list $L_1'$ is calculated (step 218b) in the same manner as above. The calculation for $M_1'$ is illustrated in FIG. 12. Then M and M' are compared to determine if M' is less than M. If M' is less than M, then the new list L' replaces the original list L, and the original list is discarded (step 222). If M' is not less than M, then the new list L' is discarded (step 224). Here, $M_1'$>M. New list $L_1'$ is discarded and sports is returned to the last position on the list. After M' and M are compared, j is increased to j+1 (step 226).

Next, the positions of traffic and weather are exchanged. The order of new list $L_2'$ is:

| Stocks | 1 |
| Weather | 2 |
| Traffic | 3 |
| Sports | 4 |

$M_2'$, the value of the objective function for this new list $L_2'$ is calculated (step 218b) in the same manner as above. The calculation for $M_2'$ is illustrated in FIG. 13. In this case, $M_2'$<M and therefore, new list $L_2'$ becomes list L, $M_2'$ becomes M, and the positions of weather and traffic remain exchanged. A final list $L_3'$ is assembled having the positions of weather and stocks exchanged. The order of new list $L_3'$ is:

| Weather | 1 |
| Stocks | 2 |
| Traffic | 3 |
| Sports | 4 |

$M_3'$, the value of the objective function for this new list $L_3'$ is calculated (step 218b) in the same manner as above. The calculation for $M_3'$ is illustrated in FIG. 14. In this case, $M_3'$>M, and this list $L_3'$ is discarded.

This process is repeated until all n (all topics on the table) are sorted according to steps 218–226. Once all of the topics are sorted, a final list $L_f$ (which in this example is list $L_2'$) is provided to the airdisk controller 120 which retrieves and arranges the topics, and generates a transmission which is transmitted by transmitter 122 (step 228). The airdisk controller 120 waits until another broadcast is to be assembled (step 230).

This method is relatively cost effective for the service provider because it may be performed with conventional equipment. For example, a single computer appropriately programmed may arrange the topics and items for each transmission.

Similar methods may also be used to arrange the information on the periodic wireless data broadcast. One alternative to the method described above is to modify step 208 by utilizing the user interest table 250 in a way which provides each user with equal "weight". That is, each user is given a finite number of "votes" (one, for example), and may cast those votes in any way the user desires, including casting a fraction of one vote. Thus, a user interested in only one stock, for example, may cast all of his votes for one stock. Another user could spread all his votes among several hundred stocks. Thus, the user interested in only a few items or topic is not "outvoted" by a user interested in several items or topics. A preferred method for accomplishing this end is for each column j, consider each user i which has an interest in the item in that column. Instead of a "1" being placed in the column, a fraction 1/x is placed there, where x is the number of items user i is interested in. After this is completed for all columns and all users, the values for each column (i.e., topic) are summed, and the topics are sorted by descending order of these sums. Then the procedure in steps 212–230 is performed as described above.

Another alternative is to use either of the two methods (the method shown in FIG. 7 or the one in the preceding paragraph) and perform them iteratively. That is, after the first topic in the final list has been chosen, delete all rows in the user interest table which have a non-zero value for that topic, and repeat the method to determine the second topic in the final list; continue with this process until all the topics have been placed in the final list. Referring to the user interest table 250 of FIG. 8, after the final list $L_f$ is determined, the entire process is repeated, except that the users interested in stocks are deleted. That is, the process is repeated for users 3, 8, and 9 only. If this second process determines, for example, that traffic is the second item on the list, a third process is performed for user 3, who is not interested in traffic or stocks.

B. Structuring An Efficient Periodic Wireless Transmission

The "storage capacity" of an airdisk may be increased by structuring the periodic broadcast to combine several channels to obtain greater aggregate capacity. One way this may be accomplished is by structuring the periodic broadcast to be theoretically compared to the technique of data striping, as is used in a Redundant Array of Inexpensive Disks (RAID).

Data striping has been known for magnetic disks since the 1980s and has been used in high performance workstations and super computers. Data striping is described, for example, in Chen et al., "RAID: High Performance, Reliable Secondary Storage", ACM Computing Surveys, Vol. 26, No. 2, June 1994. The contents of this article are incorporated herein by reference. Briefly, data striping is writing adjacent data units across an array of synchronized rotating disks. FIG. 15 shows an array of four disks 380*a–d*. The data unit (i.e, bit, byte, block etc.) used to stripe is called the striping unit. The number of disks in the array is called the stripe width. In this figure, the striping unit is 1 bit and the striping width is four disks. This structure, often referred to as a RAID, allows data to be read in parallel and therefore is a faster means for obtaining data from large memories than from a single, large disk. Using multiple disks, however, results in decreased reliability. For example, using two disks together decreases the reliability by half because there is double the possibility that one of the disks will fail. Thus, a number of redundancy and error correction schemes have been developed for use in RAIDs.

FIG. 16 illustrates seven levels of error correction used in RAIDs. These levels are:

Level 0: no error correction or redundancy.

Level 1: "mirrored redundancy". All of the data is copied twice; if one disk fails, there is an identical disk containing the data. If n disks are available, the data is striped across n/2 disks, and these disks are replicated.

Level 2: "memory-style ECC". Data is striped across a set of disks, and the remaining disks are used to store a Hamming Code error correction code. The disks with the Hamming Code are called parity disks. The number of parity disks needed is on the order of magnitude of $\log_2$ n.

Level 3: "bit interleaved parity". Data is bit interleaved across n–1 disks and one disk is used for parity.

Level 4: "block interleaved parity". This is similar to Level 3, except that the striping unit is a block, not a bit.

Level 5: "block interleaved distributed parity". Data blocks and parity are uniformly interleaved across all n disks.

Level 6: "P+Q redundancy". This is similar to Level 5, except that Reed-Solomon codes are used to protect against simultaneous disk failures.

Figure 17:
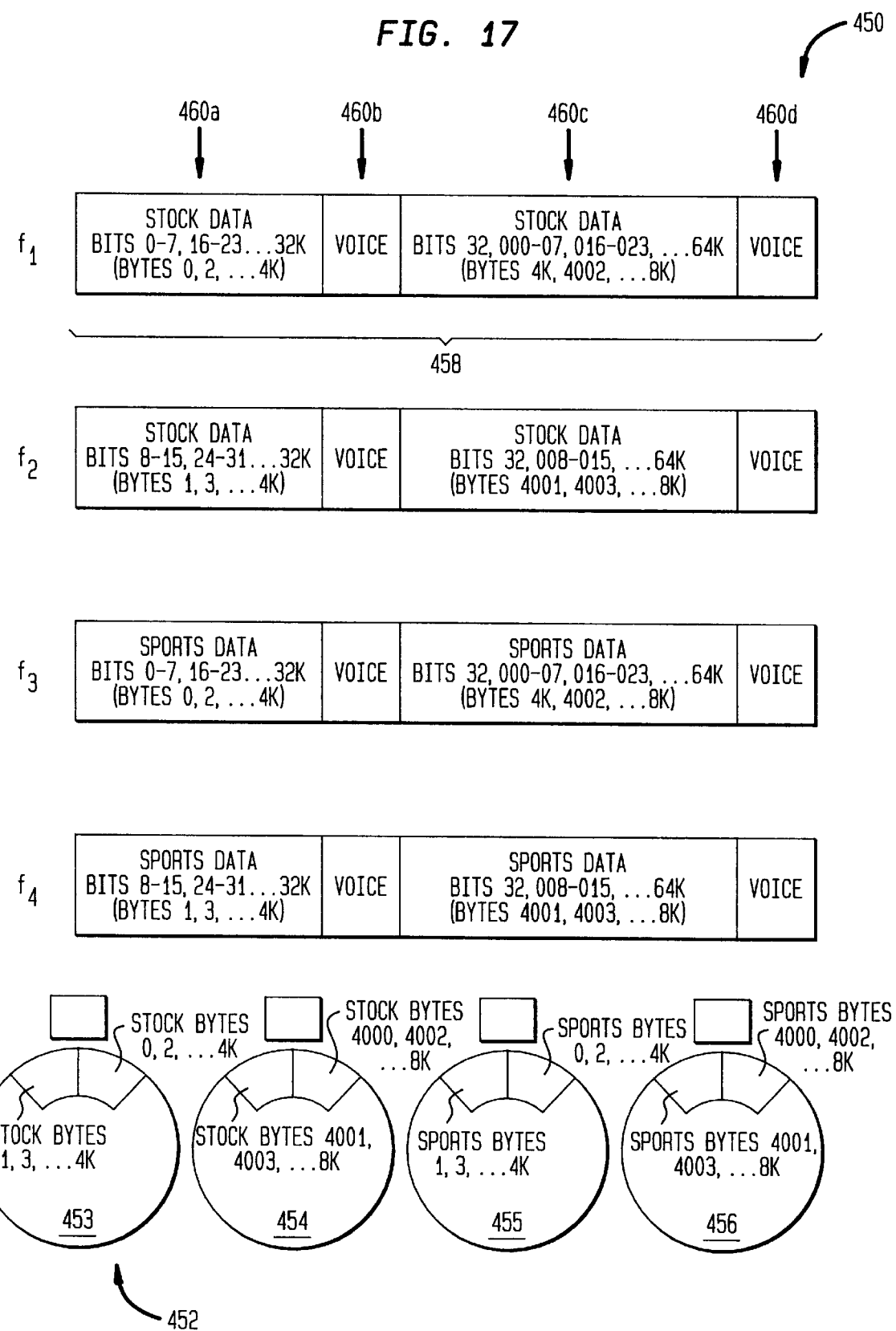
FIG. 17 compares an FDMA signal according to one embodiment of the present invention with an array of data striped disks.

FIG. 17 compares an illustrative embodiment of a FDMA wireless periodic transmission 450 having four frequencies $f_1, f_2, f_3, f_4$ with a magnetic disk RAID 452 having four disks 453, 454, 455, 456. Wireless media transmissions divide time into fixed-sized periods called "frames". In FIG. 17, the frames are the portions of each frequency shown (one frame is indicated by the bracket 458). A frame is divided into smaller units. Some of these smaller units are protocol-related information such as the preamble, index, headers, and trailers (omitted from FIG. 17 for clarity). Other smaller units containing user information (i.e., voice or data information) are called "bursts". All bursts of a transmission have the same size. Each of the four equally sized subdivisions of a burst including the same information in a plurality of frames is called a "time slot". That is, if the first burst of eight consecutive frames includes stock information, this first burst is called a time slot. For simplicity in this discussion, all bursts are referred to as time slots. In FIG. 17, the four equally sized subdivisions of each frame 458 are time slots.

The FDMA signal of FIG. 17 has four frequencies $f_1, f_2, f_3, f_4$, with each frequency having frames divided into four time slots 460*a–d*. The second and fourth time slots 460*b*, 460*d* are assigned voice information; the first and third slots 460*a*, 460*c* contain data. In this illustrative embodiment, the first and second frequencies $f_1, f_2$, contain stock information. The third and fourth frequencies $f_3, f_4$, contain sports information.

The first time slot 460*a* of the first frequency $f_1$ contains the first byte (i.e., byte 0, which includes bits 0–7) of stock information, and all subsequent even bytes (i.e., 0, 2, 4 . . . ) to its capacity. In this illustrative embodiment, the slot has a 16 kbit capacity (2 kbyte), so the highest byte in this slot is 3998. The first slot 460*a* of the second frequency $f_2$ contains the second byte (i.e., byte 1) and each subsequent odd byte (i.e, 1, 3, 5 . . . ), so the last byte of this slot is 3999. Thus, these two simultaneously transmitted frames contain the first 4 kbytes of stock information in the transmission. In this illustrative embodiment, the transmission 450 may be theoretically compared with a RAID having a one byte "striping unit" and a two disk "stripe width" of stock information.

The third slot 460*c* of the first frequency $f_1$ contains the 4001st byte (i.e., byte 4000) and each subsequent even byte (i.e., bytes 4000, 4002 . . . ) to its capacity. The third slot 460*c* of the second frequency $f_2$ contains the 4002nd byte (byte 4001) and each subsequent odd byte (bytes 4001, 4003 . . . ) to its capacity. The sports information may also be compared to a one byte "striping unit"/two disk "stripe width" RAID.

In these transmissions, the client receives the data twice as fast as would be possible in ordinary wireless media transmissions. Also, the stock information is transmitted on two frequencies ($f_1, f_2$) and the sports information is transmitted on two different frequencies ($f_3, f_4$). If a single user was interested in both topics, a receiver capable of receiving four frequencies would be needed. If a user was only interested in one of the two topics, a receiver capable of receiving only two frequencies is needed. It may be possible to have "dedicated receivers". That is, a user 32 may have a terminal 34 dedicated to receiving a subset of all the frequencies of the FDMA signal. For example, a sports-dedicated receiver could be configured to receive only $f_3$ and $f_4$.

Different air disks may have different rotation lengths. For example, if there is twice as much stock information as sports information the stock "disk" will contain twice as much data and therefore be much larger. Because the data rates of the transmissions are the same, it will take twice as long for the stock disk to complete one rotation than for the sports "disk". It is also possible that different airdisks may have different sized bursts. This is most likely to occur in FDMA airdisks.

FIG. 18 illustrates error correction formats which may be used in embodiments of wireless data broadcasts according to the present invention. These levels are:

Level 0: no error correction or redundancy.

FIG. 18(*a*) shows a TDMA signal 500 having four time periods (i.e., the periods may be time slots or frames) with no redundancy or parity.

Level 1: "mirrored redundancy". All of the data is broadcast twice; if there is a transmission or reception error with the initial broadcast, there is an identical broadcast containing the data. If n frames are available, the data is broadcast in n/2 frames, and these frames are repeated in subsequent frames.

FIG. 18(*b*) shows a TDMA signal 510, having with four time periods, data 0–data 3, and four time periods, redundancy 0–redundancy 3, containing the identical data as in the first four time periods.

Level 2: "memory-style ECC". Data is broadcast "striped" across a number of disks, and the remaining frames are used to store a Hamming Code error correction code. The frames with the Hamming Code are called parity frames. The number of parity frames needed is on the order of $\log_2$ n.

Figure 18A:
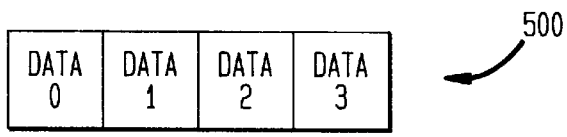
Figure 18B:
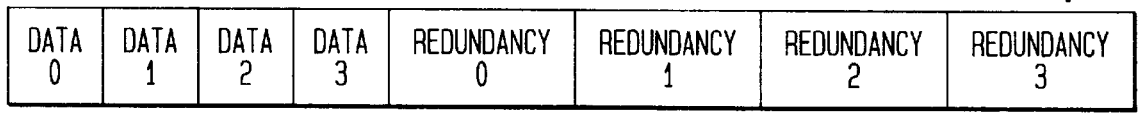
Figure 18C:
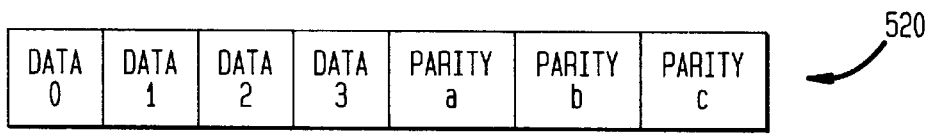

FIG. 18(c) shows a TDMA signal 520 having four time periods containing data (data 0–data 3), and three time periods containing Hamming code error correction bits (parity a–parity c). Here, there are four frames of data broadcast, and $1+\log_2 4$ frames are needed, therefore three parity frames are needed.

Level 3: "bit interleaved parity". Data is bit interleaved across n−1 frames and one frame is used for parity.

Figure 18D:
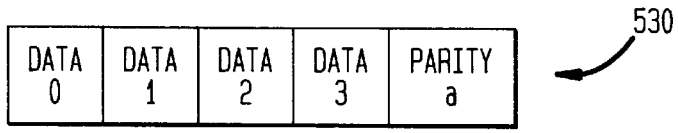

FIG. 18(d) shows a TDMA signal 530 having four time periods containing data (data 0–data 3), and one time period containing bit interleaved parity parity a).

Level 4: "block interleaved parity". This is similar to Level 3, except that the striping unit is a block, not a bit.

FIG. 18(e) shows a TDMA signal 540 having four time periods containing data blocks (data blocks 00–04, 10–14, 20–24, 30–34) and a one time period containing block interleaved parity (parity a0–a4).

Level 5: "block interleaved distributed parity". Data blocks and parity blocks are uniformly interleaved across all n frames.

FIG. 18(f) shows a TDMA signal 550 having five time periods containing interleaved data blocks (data blocks 0–19) and parity blocks (parity blocks 0–4). The interleave pattern shown in this figure is called the left symmetric parity placement, which has been found to be a preferred arrangement for distributing parity blocks.

Level 6: "P+Q redundancy". This is similar to Level 5, except that Reed-Solomon codes are used to protect against simultaneous frame failures.

FIG. 18(g) shows a TDMA signal 560 having six time periods containing interleaved data blocks (data blocks 0–19) and parity blocks (parity blocks 0P–4P, 0Q–4Q).

The parity writing for the airdisk may be performed in the airdisk controller 120. Parity, or redundancy, may be needed for each transmission (if information has been revised). This may be performed, for example, by performing an Exclusive-Or operation of the new data with the data from the previous transmission.

It is also contemplated that airdisks may be structured using TDMA and CDMA signals as well. For example, each time slot of a TDMA signal may be structured to be an independent airdisk.

C. Conclusion

An improved periodic wireless transmission is described. One improvement is the manner in which topics are ordered on the transmission. A second improvement is combining several channels to increase aggregate signal capacity. Both improvements decrease the average access latency, resulting in less stale data delivered to customers and reduced power consumption by reducing the "on" time of wireless data terminals.

The above described embodiments of the invention are intended to be illustrative only. Numerous alternative embodiments may be devised by those skilled in the art without departing from the spirit and scope of the following claims.

We claim:

1. A method for periodic wireless data broadcasting of data items wherein the data items are arranged to reduce the average access latency for users of the broadcast data, said method comprising the steps of receiving the data items to be broadcast;

collecting user interest information with respect to the data items;

retrieving the collected user interest information;

generating a user interest table based upon the retrieved user interest information;

based on the user interest table, calculating a list of data items and sorting the list according to the retrieved user interest information; and broadcasting the data items in the order arranged according to the sorted list.

2. The method of claim 1 wherein the step of collecting user interest information comprises accessing information obtained from a user profile.

3. The method of claim 1 wherein the step of collecting user interest information comprises accessing information obtained by polling at least a subset of all users.

4. The method of claim 1 wherein the step of collecting user interest information comprises accessing information obtained by monitoring an uplink for user requests to assure that users requesting unpopular data items are not blocked, the step of broadcasting including broadcasting all of the most popular data items in each broadcast and broadcasting varying subsets of less popular data items in different broadcasts.

5. The method of claim 4, wherein the step of monitoring further includes disregarding user requests for information already determined to be included in the period data transmission.

6. The method of claim 4, wherein the step of monitoring further comprises precluding users from requesting information already determined to be included in the periodic data transmission.

7. The method of claim 6, further comprising performing the step of precluding for a limited time period.

8. The method of claim 1 wherein the step of calculating a list of data items and sorting the list comprises:

a. assigning values to entries on the user interest table; and b. using the values on the user interest table to sort the data items for broadcasting onto the list.

9. The method of claim 8, wherein the step of using the values includes calculating an objective function for the list.

10. A method for arranging items on a periodic data transmission, comprising the steps of:

obtaining items for transmission;

accessing user interest information; and sorting the items for transmission according to the accessed user interest information, said step of sorting comprising the steps of comparing each pair of adjacent items and exchanging the adjacent items' position on the transmission if the exchange results in a lower average access latency.

11. A method for arranging items on a periodic data transmission, comprising the steps of:

obtaining items for transmission;

accessing user interest information; and sorting the items for transmission according to the accessed user interest information, said step of sorting comprising generating a user interest table reflecting the accessed user interest information, assigning values to entries on the user interest table, and using the values on the user interest table to sort the items for transmission onto a list by calculating an objective function for the list, said step of calculating an objective function comprising:
assigning a numerical value to each item based on its position on the list;
determining a maximum position value on the list for each user whose user interest is accessed; and
summing the maximum position values to obtain a first objective function.

12. The method of claim 11, wherein the step of sorting further comprises:
a. creating a new list by exchanging two adjacent items' positions on the first list;
b. reassigning a numerical value to each item based on its position on the new list;
c. determining a new maximum position value on the new list for each user whose user interest information is accessed;
d. summing the new maximum position values to obtain a new objective function;
e. comparing the new objective function and the first objective function;
f. if the new objective function is one of greater than and equal to the first objective function, returning the adjacent items to their positions on the first list;
g. if the new objective function is less than the first objective function, then:
(1) retaining the exchanged positions of the adjacent items; and
(2) replacing the first objective function with the new objective function;
h. repeating steps a–g until each pair of adjacent items has been compared; and
i. creating a final list after each pair of adjacent items has been compared.

13. The method of claim 12, further comprising:
a. after each pair of adjacent items has been exchanged, deleting from the user interest all user entries interested in a first item on the final list;
b. repeating the steps of assigning the values to entries on the user interest table and using the values on the user interest table to sort the items for transmission onto a list by calculating an objective function for the list; and
c. repeating steps a and b until no user entries remain on the user interest table.

14. A method for arranging items on a period data transmission, comprising the steps of:
obtaining items for transmission;
accessing user interest information; and
sorting the items for transmission according to the accessed user interest information, said step of sorting comprising generating a user interest table reflecting the accessed user interest information, assigning values to entries on the user interest table, and using the values on the user interest table to sort the items for transmission onto a list; and
wherein the step of assigning values comprises each user casting a finite number of votes for each item that a user is interested in.

15. The method of claim 14, wherein the finite number of votes is one, and each item a user is interested in receives a value of 1/x, where x is the total number of items that that user is interested in.

* * * * *